United States Patent [19]

Kimura

[11] Patent Number: 4,818,851
[45] Date of Patent: Apr. 4, 1989

[54] HIGH PRECISION COORDINATE INPUT DEVICE USING SEQUENTIALLY DRIVEN CONDUCTORS IN AN INPUT PLANE AND STORED CORRECTION VALUES

[75] Inventor: Kiyoshi Kimura, Aza-Fujigasaki, Japan

[73] Assignee: Alps Electric Co., Ltd., Japan

[21] Appl. No.: 934,665

[22] Filed: Nov. 25, 1986

[30] Foreign Application Priority Data

Dec. 18, 1985 [JP] Japan .................. 60-282772

[51] Int. Cl.$^4$ ............................................. G08C 21/00
[52] U.S. Cl. ....................................... 235/472; 178/19
[58] Field of Search ................. 235/472, 470, 454; 250/566; 33/1 M; 178/18, 19; 382/59

[56] References Cited

U.S. PATENT DOCUMENTS

| | | | |
|---|---|---|---|
| 3,828,128 | 8/1974 | Dethloff et al. | 235/492 X |
| 4,260,852 | 4/1981 | Fencl | 178/19 |
| 4,692,568 | 9/1987 | Morita | 178/19 |
| 4,713,496 | 12/1987 | Kimura et al. | 178/18 |
| 4,740,660 | 4/1988 | Kimura | 178/19 |
| 4,758,690 | 7/1988 | Kimura | 178/19 |

FOREIGN PATENT DOCUMENTS 59-13074 3/1984 Japan .
61-275925 12/1986 Japan .

Primary Examiner—Philip H. Leung
Attorney, Agent, or Firm—Guy W. Shoup; Paul J. Winters; Brian D. Ogonowsky

[57] ABSTRACT

A coordinate input apparatus for detecting a coordinate position on the basis of a signal detected by a coordinate designator which can freely point on an input surface in which a plurality of conductors are embedded in parallel to each other, the conductors constituting in combination a main loop to which scanning signals are supplied sequentially. A compensating loop which is composed of a conductor is provided in the vicinity of a common conductor of the main loop separately therefrom such as to surround the main loop. A constant current is delivered to the compensating loop in the reverse direction to that flowing on the main loop to mitigate the magnetic field produced by a common conductor. A compensationg value which corresponds to the approximate position of the coordinate designator is called from a first storing means to calculate the interpolating value thereof. A correction value for correcting the error between the interpolating value and the actual position of the coordinate designator is called from a second storing means in order to specify the position pointed by the coordinate designator on the basis of the interpolating value and the correction value.

12 Claims, 9 Drawing Sheets

HIGH PRECISION COORDINATE INPUT DEVICE USING SEQUENTIALLY DRIVEN CONDUCTORS IN AN INPUT PLANE AND STORED CORRECTION VALUES

BACKGROUND OF THE INVENTION

1. Field of the Invention

The present invention relates to a coordinate input apparatus which is capable of reading with high accuracy the position designated on the input surface.

2. Description of the Prior Art

As an example of conventional coordinate input devices for reading with high accuracy, the position designated on a surface, the device disclosed in Japanese Patent Publication No. 13074 published 3-27-84 will be cited. This coordinate input apparatus is composed of a tablet on which a plurality of parallel scanning lines are embedded, and a coordinate designator having an exciting coil which produces alternating field, the coordinate designator being provided in proximity to the scanning lines. Scanning signals in the form of, for example, a rectangular pulse are subsequently applied to the scanning lines, whereby induction signals which assume the state of being placed on the rectangular pulse scanning signals are subsequently detected. From the detected induction signal having the maximum value the corresponding rectangular pulse scanning signal is obtained, and the scanning line which has delivered this signal is determined to be the coordinate value of the scanning line closest to the coordinate designator. Then, from the maximum value of the detected induction signal and the magnitude of a given induction signal adjacent to the detected induction signal, the distance between the scanning line closest to the coordinate designator and the coordinate designator (coordinate value between the scanning lines) is determined. The sum of the coordinate value of the closest scanning line and the distance between the closest scanning line and the coordinate designator is calculated, and thus the coordinate value of the input coordinate designator is determined.

Another example of the prior art is disclosed in the specification of Japanese Patent Application No. 117761/1985 filed by the same applicant. In this coordinate input apparatus, at least two conductors are selected from a plurality of conductors embedded in a tablet, scanning signals of the same phase are simultaneously supplied to the selected conductors, the signals produced by the scanning signals which have been supplied to the conductors are detected by a coordinate designator, whether or not the polarity of these signals is inverted is judged, the signal levels before and after the inversion of the polarity of the signals are detected, and the position which the coordinate designator points is calculated and detected from the position at which the inversion of the polarity is judged and the signal levels.

In the first prior art example, it is necessary to obtain the maximum value of the detected induction signal, and for this purpose, A/D conversion is required at every loop, resulting in a long scanning time.

Furthermore, since the magnetic field excited by the coordinate designator is detected on the scanning line side of the input surface, the detecting portion exists over the entire surface of the input surface, whereby the detecting portion is susceptible to external noise and involves a danger of occurrence of errors.

On the other hand, in the second prior art example, since it is necessary to supply scanning signals of the same phase to at least two selected conductors, a driver of an independent constant-current amplitude is required for each conductor, and further two transistors, two resistors, one precision resistor and one operational amplifier are required for each conductor. Accordingly, though high precision is obtained, a high cost is disadvantageously involved in providing the circuit.

Furthermore, since a multiplicity of parts are used, it is difficult to control variability of the parts during production and it takes much trouble to adjust them after assembly.

In scanning, since an inexpensive decoder IC cannot be used because its output is always delivered from one line, a shift register must be incorporated, and the use of shift register takes much time before the relevant conductor is driven.

SUMMARY OF THE INVENTION

Accordingly, it is an object of the present invention to provide a coordinate input apparatus which is not subject to external influence and is capable of high-accurate input in a short processing time.

To achieve this aim, the present invention provides a coordinate input apparatus for detecting a coordinate position on the basis of a signal detected by a coordinate designator which can freely point on an input surface in which a plurality of conductors are embedded in parallel to each other, the conductors constituting in combination a main loop to which scanning signals are supplied sequentially. The coordinate input apparatus is composed of the main loop; a compensating loop which is composed of a conductor provided in the vicinity of a common conductor of the main loop separately therefrom such as to surround the main loop; a switching means for delivering scanning signals subsequently to selected respective loops which are incorporated in the main loop; a coordinate designator for detecting signals produced by the scanning signals delivered to the respective loops by means of the switching means; a polarity detection means for judging the inversion of the polarity of the signals detected by the coordinate designator; a first storage means for storing in advance the compensating values corresponding to the approximate respective coordinate positions on the input surface of the coordinate designator when a predetermined current is supplied to the respective loops with the current to be delivered to the compensating loop being kept constant; an arithmetic unit for detecting the approximate coordinate position of the coordinate designator on the basis of the scanned position where the inversion of polarity is detection by the polarity detection means and calling the compensating value corresponding to that position from the first storage means, and for calculating the interpolating value which interpolate the position pointed by the coordinate designator from the magnetic field intensities of the loops before and after the loop the inversion of whose polarity is detected, the magnetic field intensity of the compensating loop to which a constant current is being delivered after the stop of delivery of current to the main loop, and the called compensating value; a second storage means for storing the correction values for correcting the errors between the interpolating value and the actual position pointed by the coordinate designator; and an arithmetic unit for calculating the final position pointed by the coordinate designator from the approximate coordinate position and the correction value.

The coordinate input apparatus according to the present invention mitigates the magnetic field produced by a common conductor line (source line) which supply current to the main loop to a certain degree by supplying a constant current to the compensating loop in the reverse direction thereto, delivers scanning signals subsequently to the respective loops in this state to detect their magnetic field intensities, introduces the compensating value which corresponds to the approximate position of the coordinate designator, calculates the interpolating value in the approximate position of the coordinate designator from these magnetic field intensities and the compensating value, and further introduces a correction value for correcting the error between the interpolating value and the actual position of the coordinate designator, thereby specifying the position pointed by the coordinate designator on the basis of the interpolating value and the correction value. The principle will be explained in the following.

On the input surface of the coordinate input apparatus loops L of conductors are embedded, e.g., at intervals of 5 mm, as shown in FIG. 13, and constituting in combination a main loop 2a of 200 mm×200 mm. On the outer peripheral portion of the main loop 2a in the vicinity of a common conductive line (source line) 2s, a compensating loop 3a is formed such as to surround the main loop 2a. To the compensating loop 3a current in the reverse direction to that delivered to the main loop 2a is delivered so as to mitigate at least the magnetic field produced by the source line 2s to a certain extent, thereby reducing the influence of the magnetic field on each loop L.

It is here assumed that the coordinate designator (hereinunder referred to as a "pickup") is situated at the position A on the input surface of the coordinate input apparatus.

It is necessary first to detect an approximate position of the pickup on the input surface of the coordinate input apparatus, namely the segment identified in FIG. 14. FIG. 14 shows an example of the distribution of detected voltages. With respect to the magnetic field intensity Hz corresponding to each loop L, the distribution is positive on the left-hand side of zero and negative on the right-hand side of zero. The voltage is detected in terms of the absolute value of the magnetic field Hz. The input surface shown in FIG. 14 corresponds to that shown in FIG. 13, each loop being set at an interval of 5 mm, each segment at an interval of 10 mm, and adjacent intervals overlapping each other by 5 mm. For the convenience of explanation, the loops corresponding to X = 5n mm, 5(n+1) mm, 5 (n+2) mm, 5 (n+3) mm, and 5 (n+ 4) mm, respectively, are referred to as L5n, L5(n+1), L5 (n+2), L5 (n+3), and L5 (n+4), respectively. ("n" is an integer which satisfies the following condition: $0 \leq n \leq 37$)

When the pickup is situated at the position A, scanning signals are delivered subsequently to each of the loops. It is not until L5 (n+3) is energized, in other words, until SEG=n+3, X=5 (n+3) mm that the magnetic field becomes positive. From this fact it is found that at least X is in the region of X<5 (n+3) mm. The detected voltage at the loop L5 (n+3) is $V_{n+1}$. The loop precedent by two, namely, the loop L5 (n+1) in the SEG=n 1 and X=5 (n+1) mm, is next selected and the detected voltage $V_{n+1}$ is obtained. At this time, the magnetic field is negative as a matter of fact, and the polarity is inverted between the loops L5 (n+1) and L5 (n+3). Therefore, it is understood that the position A is in the region of SEG=n+1, namely, in the region of 5 (n+1) mm $\leq X \leq 5$ (n+3) mm. As viewed in FIG. 13, the position A is in the region of 15 mm $\leq X \leq 25$ mm, and SEG=3.

If the voltage is $V_c$ which is detected by the pickup from the magnetic field produced by the compensating loop 3a when supply of current to the main loop is stopped and a predetermined current is only delivered to the compensating loop 3a, and a certain compensating value ISC is selected, the position of the pickup in the segment, namely, the interpolating value P' is calculated by the following formula (1):

$$P = \frac{V_{n+1} - ISC \cdot V_c}{V_{n+1} + V_{n+3}} \quad (1)$$

The Y interpolating value of the Y coordinate (loop in the direction Y) is also obtained by calculating a similar formula with respect to the Y coordinate.

These interpolating value alone in this method, however, are not sufficient in terms of accuracy, because since only one loop is driven, the linearity of the output voltage characteristic cannot be secured when detecting the magnetic field intensity. In order to correct the interpolating values, correction values are introduced. The correction values for correcting the errors between the interpolating values and the measured position of the pickup are stored in advance in a storage means such as a ROM table. The correction value which corresponds to the interpolating value is called to specify the exact position of the pickup in the segment, and the coordinate position of the segment and the position introduced by the correction value in the segment are finally synthesized, thereby detecting the exact position on the input surface. According to this principle of detection, a coordinate position is able to be detected with high accuracy even when loops are subsequently scanned one by one.

The above and other objects, features and advantages of the present invention will become clear from the following description of the preferred embodiment thereof, taken in conjunction with the accompanying drawings.

DESCRIPTION OF THE PREFERRED EMBODIMENT

An embodiment of the present invention will be explained hereinunder with reference to the accompanying drawings.

Figure 1:
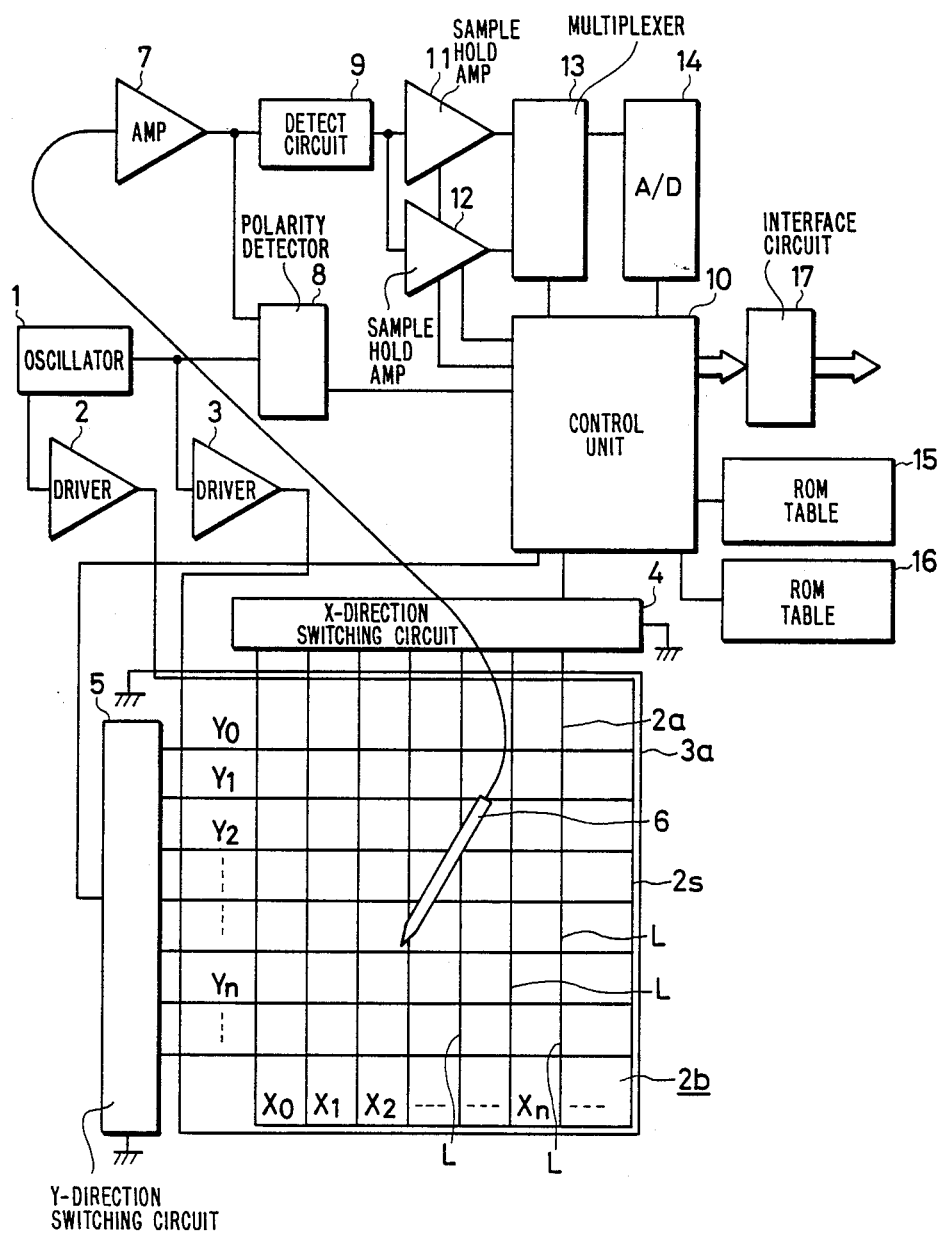
FIG. 1 shows the principle and the structure of an embodiment of a coordinate input apparatus according to the present invention.

Referring first to FIG. 1, an embodiment of a coordinate input apparatus according to the present invention is composed of an input surface 2b provided with a main loop 2a, a compensating loop 3a, a driver 2 for delivering current of a constant amplitude to the main loop 2a through an oscillator 1, a driver 3 for delivering current to the compensating loop 3a, a pickup 6 functioning as a coordinate designator and having a magnetic field detection coil, an amplifier 7 for amplifying the output detected by the pickup 6, a polarity detection circuit 8, a detection circuit 9, sample hold amplifiers 11 and 12, a multiplexer 13, an A/D converter 14, a ROM table 15 functioning as a first storage means which stores compensating values, a ROM table 16 functioning as a second storage means which stores correction values for correcting the errors of interpolating values, and a control unit 10. The loops in the direction X of the main loop 2a are provided with an X-direction switching circuit 4 and the loops in the direction Y are provided with a Y-direction switching circuit 5.

The main loop 2a consists of loops L which are embedded in the input surface 2b at intervals of 5 mm. One end of each of the loops L is connected to the switching circuit 4 (in the case of a loop in the direction Y, to the switching circuit 5) and the other end thereof is connected to a source line 2s, which in turn is connected to the driver 2. The loops in combination constitute the input surface 2b of, e.g., 200 mm×200 mm as a whole. The loops in the direction Y are formed in a similar way so as to be orthogonal to the loops in the direction X.

The compensating loop 3a consists of a conductor embedded in the vicinity of the source line 2s of the main loop 2a separately therefrom such as to surround the main loop 2a. One end of the compensating loop 3a is connected to the driver 3 which delivers current of a predetermined amplitude and in the reverse direction to the current flowing on the source line 2s of the main loop 2a, and the other end is grounded.

On the ROM table 15 as the first storage means are stored compensating values, such as those shown in Table 1, in correspondence with the respective loops L and the region in the direction Y.

TABLE 1

| | Compensating Value ISC | | | | | | |
|---|---|---|---|---|---|---|---|
| | Y (mm) | | | | | | |
| X (mm) | 20 (180) | 25 (175) | 30 (170) | 40 (160) | 60 (140) | 80 (120) | 100 |
| 5 | 0.486 | 0.471 | 0.455 | 0.425 | 0.382 | 0.359 | 0.352 |
| 10 | 0.378 | 0.364 | 0.350 | 0.323 | 0.286 | 0.267 | 0.262 |
| 15 | 0.354 | 0.341 | 0.328 | 0.304 | 0.269 | 0.252 | 0.246 |
| 20 | 0.357 | 0.345 | 0.332 | 0.309 | 0.276 | 0.259 | 0.254 |
| 25 | 0.368 | 0.357 | 0.345 | 0.323 | 0.292 | 0.275 | 0.269 |
| 30 | 0.382 | 0.372 | 0.361 | 0.340 | 0.310 | 0.293 | 0.288 |

The relevant compensating value ISC is called from the ROM table 15 to the control unit 10 in correspondence with the detected result of the control unit 10, the control unit 10 calculating the interpolating value by means of the arithmetic unit provided therein.

The ROM table 16 as the second storage means stores correction values for correcting the errors of the calculated interpolating values in order to obtain the exact coordinate position. For example, a correction value for an interpolating value is stored at every 0.1 mm with respect to the detected segment. An example is show in Table 2. These correction values are examples of those used for correcting the interpolating values from 0.00 mm to 2.00 mm in the segment SEG=19 between X=95 mm and X=105 mm under the condition that Y=100 mm, and the detecting height Z=15 mm.

TABLE 2

| Correction Values | |
|---|---|
| Interpolating Value (mm) | Correction Value (mm) |
| 0.00 | 0.00 |
| 0.10 | 0.07 |
| 0.20 | 0.14 |
| 0.30 | 0.21 |
| 0.40 | 0.29 |
| 0.50 | 0.36 |
| 0.60 | 0.44 |
| 0.70 | 0.52 |
| 0.80 | 0.59 |
| 0.90 | 0.67 |
| 1.00 | 0.75 |
| 1.10 | 0.84 |
| 1.20 | 0.92 |
| 1.30 | 1.00 |
| 1.40 | 1.09 |
| 1.50 | 1.17 |
| 1.60 | 1.26 |
| 1.70 | 1.35 |
| 1.80 | 1.44 |
| 1.90 | 1.53 |
| 2.00 | 1.63 |

According to Table 2, when the calculated interpolating value is 0.9 mm, the correction value 0.67 mm is to be selected.

Figure 2:
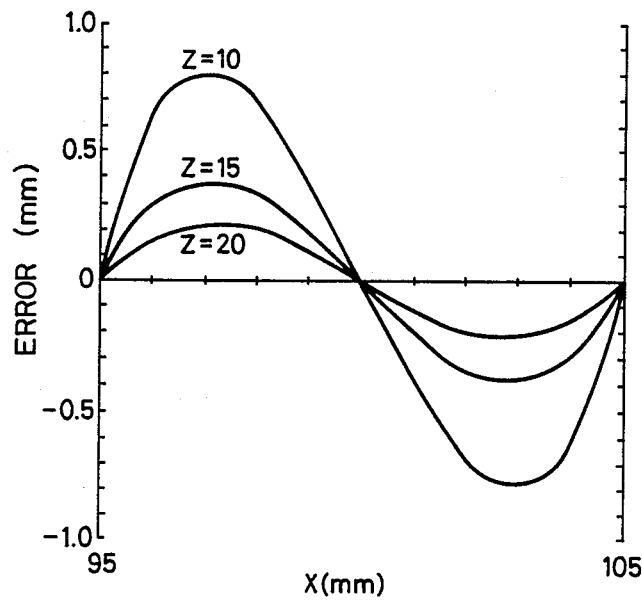
FIG. 2 is a graph showing the relationship between the height of a pickup and an error.

The pickup 6 is provided with a magnetic field detection coil at the tip thereof, and the voltage which is produced by the magnetic field detection coil is supplied to the polarity detection circuit 8 through the amplifier 7. Since the pickup 6 detects the magnetic field produced when each loop L is energized, the height of detection is important in relation to errors and detected intensities (magnetic field intensities). The errors at the central part of the input surface 2 are plotted with the height Z of the pickup as a parameter, and the results are shown in FIG. 2. When Z>15 mm, the error is less than 0.4 mm, but if the pickup is more than 15 mm apart from the surface, the vertical component of the magnetic field becomes weak. Therefore, this embodiment adopts Z=15 mm as a point of compromise. This height is equivalent to 1.5 times the pitch of the loops used for interpolation, and it goes without saying that if the interval of the loops are reduced, the value Z is reduced.

The operation of the coordinate input apparatus will now be explained.

The position of the pickup 6 is detected in the following three steps: the step of detecting the segment which is an approximate position of the pickup 6; the step of interpolating the detected segment to detect a more precise position in the segment; and the step of synthesizing the position of the segment and the more precise position in the segment.

At the time of detection of the segment, the drivers 2 and 3 are first actuated by means of the sine wave produced by the oscillator 1. In this state, current is delivered subsequently by the driver 2 to a specific loop L alone selected from the switching circuit 4 or 5 which is designated by the control unit 10. At this time, current of half the amplitude of the current flowing on the main loop 2a is supplied to the compensating loop 3a by the driver 3.

When current flows on each loop L, the magnetic field produced by the respective loop L is detected by the pickup 6, and is amplified into a signal of a desired amplitude by the amplifier 7. The phase of this signal is compared with that of the output of the oscillator 1 by the polarity detection circuit 8 (phase comparator). In other words, the polarity of the magnetic field is detected by this circuit. If a loop L on the left-hand side of the pickup 6 in FIG. 1 is driven and the output of the polarity judgment circuit 8 is "H", then when a pickup L on the right-hand side is driven, the output of the polarity detection circuit 8 is inverted to "L" because the polarity of the detected magnetic field is then inverted.

Figure 14:
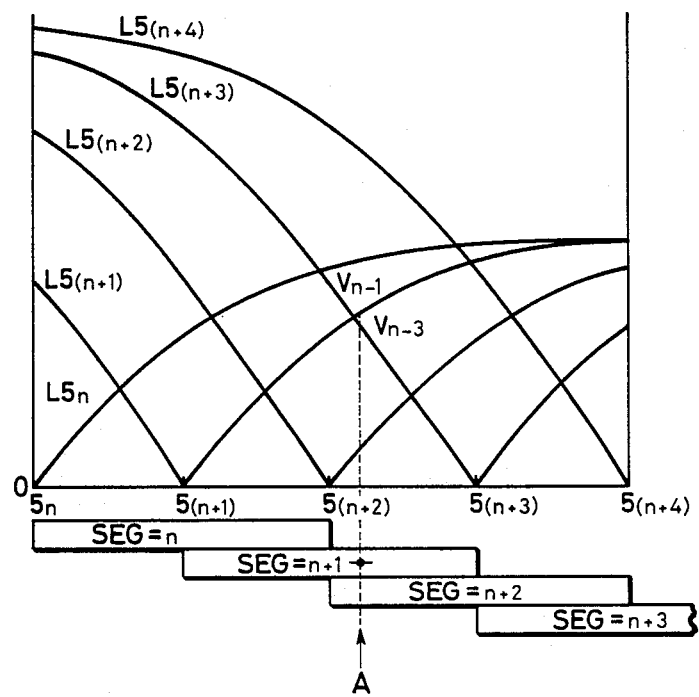
FIG. 14 is an explanatory view of the principle of detection.

Accordingly, if current is delivered sequentially to the loops $X_0$, $X_1$, $X_2$, $X_n$, respectively, which is selected by the control unit 10, the output of the polarity detection circuit 8 is inverted in the vicinity of the pickup 6, whereby the approximate position of the pickup 6, namely, the segment is determined, as has been explained above with reference to FIG. 14.

When the segment (hereinunder "the segment" means SEG=n+1 in FIG. 14) is detected, the control unit 10 first selects the loop L5 (n+1) on the left-hand end of the segment. At this time the signal which has passed through the pickup 6 and the amplifier 7 is converted to the direct current through the detection circuit 9 and is held by the sample hold circuit 11 as a direct voltage.

The control unit 10 next selects the loop L5 (n+3) on the right-hand end of the segment SEG=n+1. At this time, the loop L5 (n+2) has jumped to the next loop L5 (n +3), because segments are set so as to overlap each other by ½ to improve the accuracy. The direct voltage obtained by the detection circuit 9 is similarly held by the sample hold circuit 12.

Figure 3:
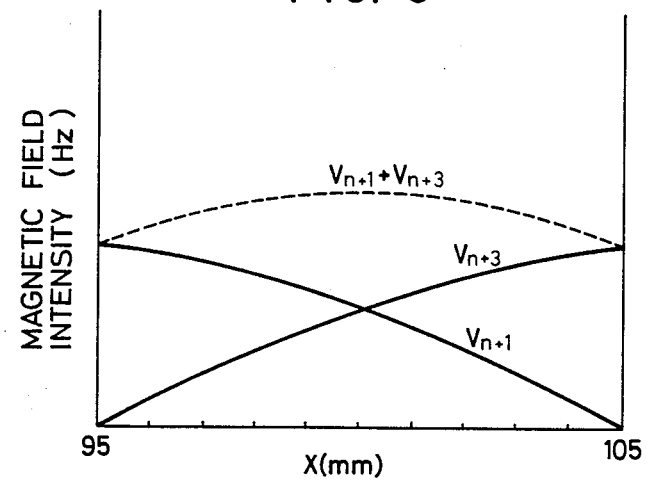
FIG. 3 is a graph showing an example of the distribution of magnetic field intensities when the height of the pickup is fixed.

In this state, the multiplexer 13 selects the voltages held by the sample hold circuits 11 and 12 by a signal of the control unit 10 and converts them to digital values by the A/D converter 14. Thus the voltages $V_{n+1}$ and $V_{n+3}$ are obtained from the loops L5 (n+1) and L5 (n+3), respectively. FIG. 3 is a graph showing an example of the distribution of the magnetic field intensities when the height of the pickup is fixed.

The control unit 10 then turns off both the switching circuits 4 and 5, whereby the predetermined current flows only on the compensating loop 3a. In the same way as above, the detected output is A/D converted to obtain the voltage $V_c$ only from the compensating loop 3a.

The control unit 10 next calls, e.g., from Table 1, the compensating value ISC which corresponds to the value of the segment in the directions X and Y obtained by the segment judgment. The detected voltages $V_{n+1}$, $V_{n+3}$ and $V_c$ and the compensating value ISC are substituted into the formula (1) to calculate the interpolating value P' by the arithmetic unit in the control unit 10.

Figure 4:
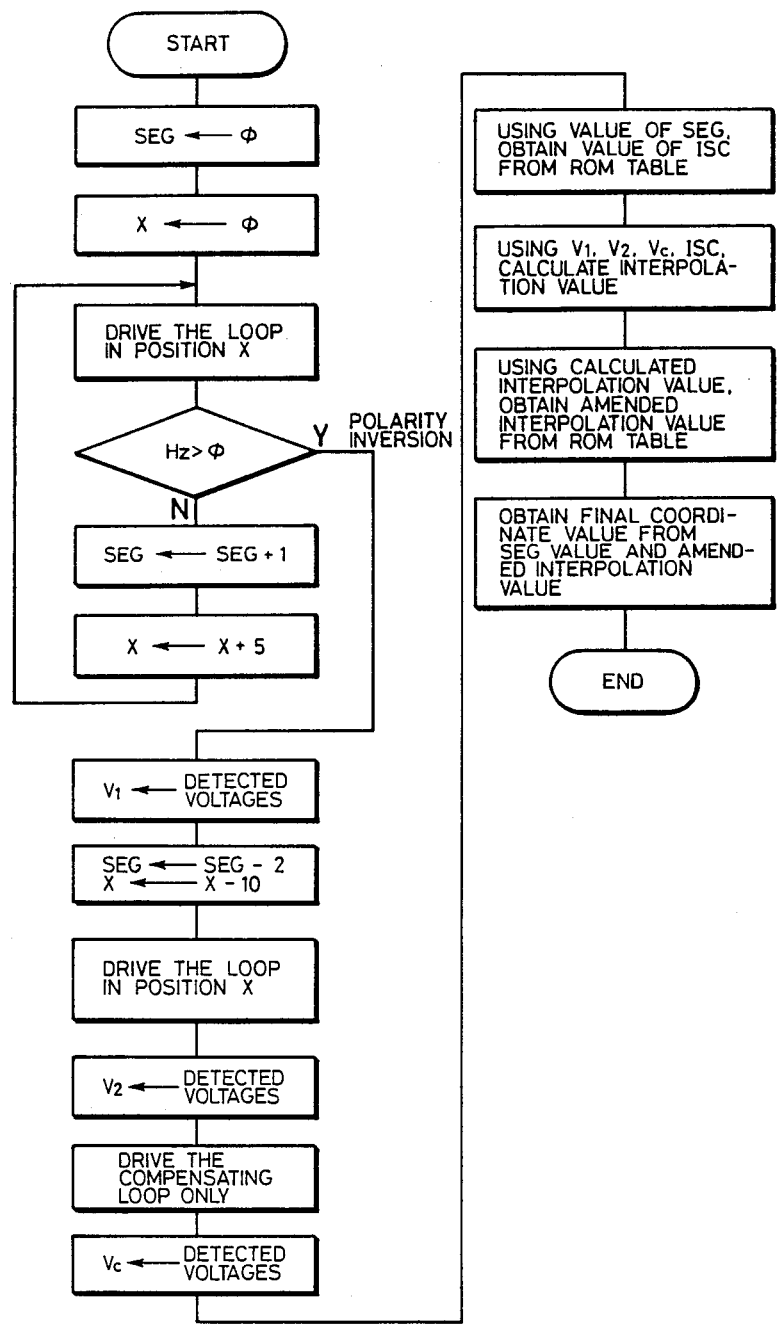
FIG. 4 is a flow chart of the detecting operation.

After the interpolating value P' is calculated, the relevant correction value is called from the ROM table 16 which stores correction values for correcting errors, thereby obtaining the coordinate value to specify the position in the segment. Thereafter, by synthesizing the position coordinate of the segment and the coordinate value within the segment by the arithmetic units in the control unit, the final X coordinate of the position pointed by the pickup 6 is calculated. FIG. 4 is a flow chart of the detecting operation and subsequent calculations used to derive the final X coordinate position.

Similarly, the Y coordinate of the position pointed by the pickup is calculated, and the thus calculated coordinate values are output to a host computer through an interface circuit 17.

Figure 13:
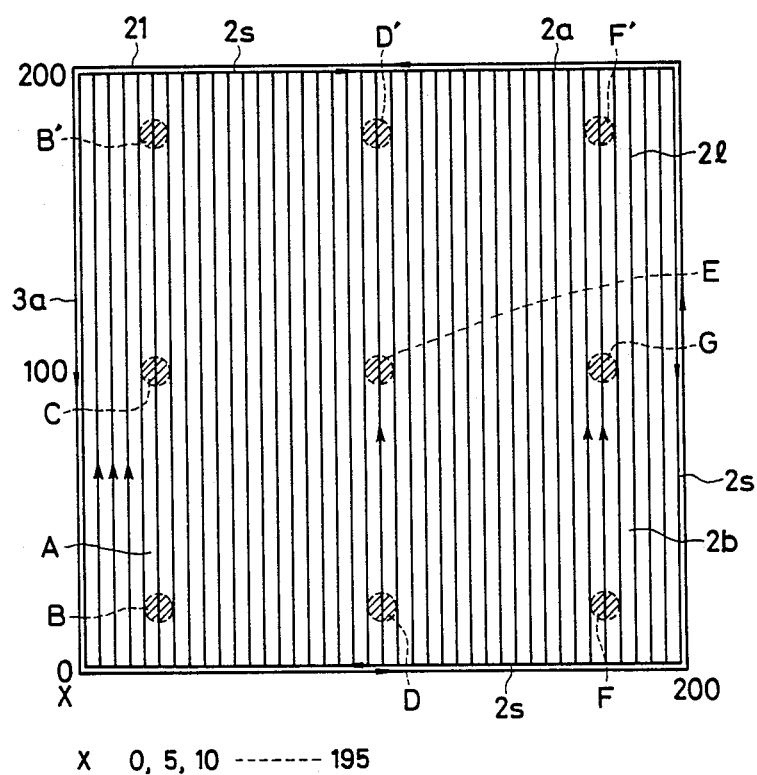
FIG. 13 is a schematically explanatory view of a main loop and a compensating loop.

To describe this more concretely, if, for example, the pickup 6 is situated at the point A in FIG. 13, it is in the vicinity of the loop L5 (n+2) (n=2, in FIG. 14) of X=20 mm, whereby SEG=3 is detected. By scanning in the direction Y, it is detected that the pickup is in the vicinity of Y=40 mm. The compensating value ISC=0.309 is selected from the ROM table 15, and interpolating value P' is calculated from the voltages $V_3$ and $V_5$ produced by the loops L15 and L25, respectively, on both ends of SEG=3, and the voltage $V_c$ produced by the compensating loop 3a. After the interpolating value P' is calculated, an appropriate correction value, for example, 6.50 is called from the ROM table 16, and this value is added to the minimum value of the SEG=3, in this case, 15 mm, thereby obtaining the X coordinate value X=21.50 mm.

The difference between the coordinate value calculated in this way and the coordinate value of the actual position of the pickup, namely, the error, will be discussed hereinunder.

Figure 5:
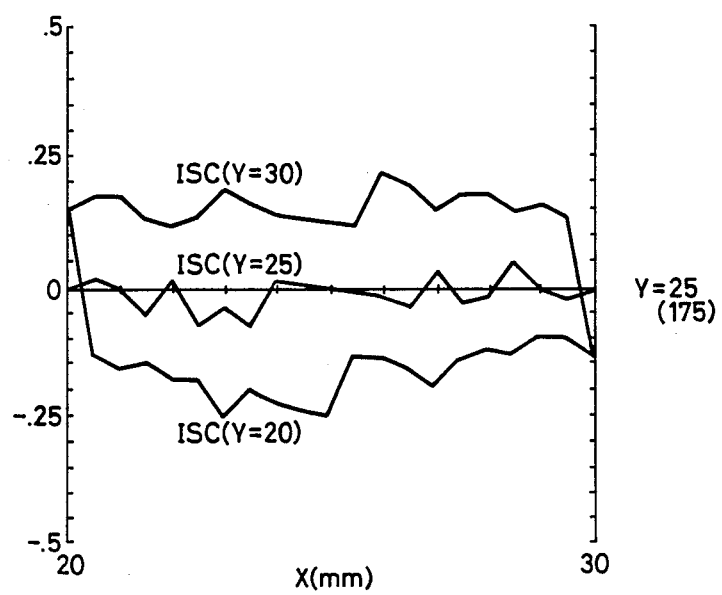
FIGS. 5 and 6 are graphs showing the errors of the interpolating values.
Figure 6:
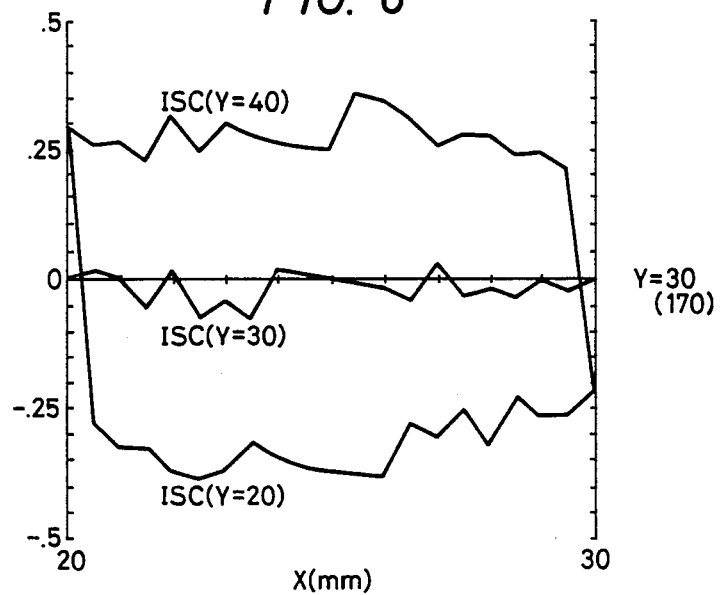
Figure 7:
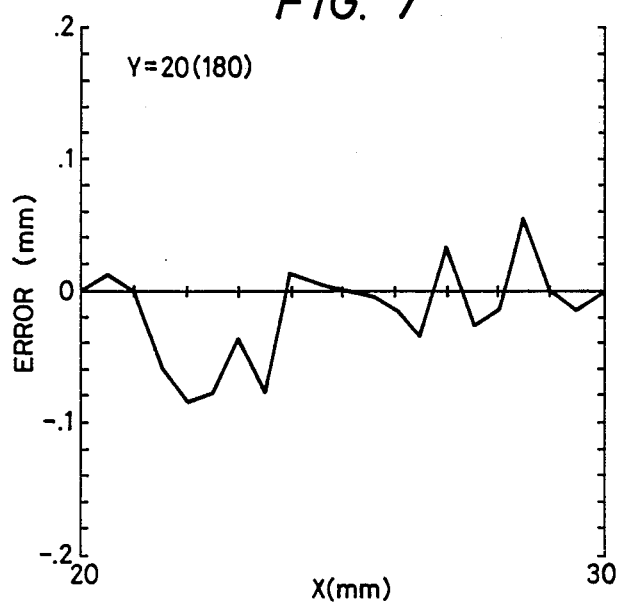
FIGS. 7, 8, 9, 10, 11 and 12 are graphs showing the errors of the coordinate values obtained by correcting the interpolating values by the correction values.
Figure 8:
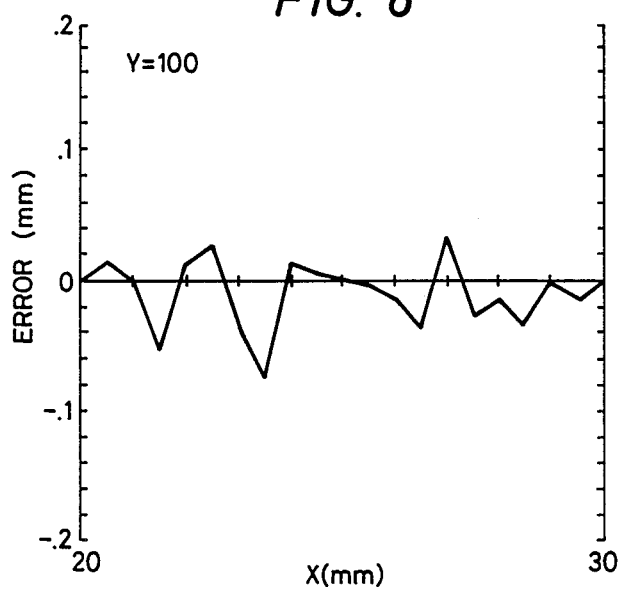
Figure 9:
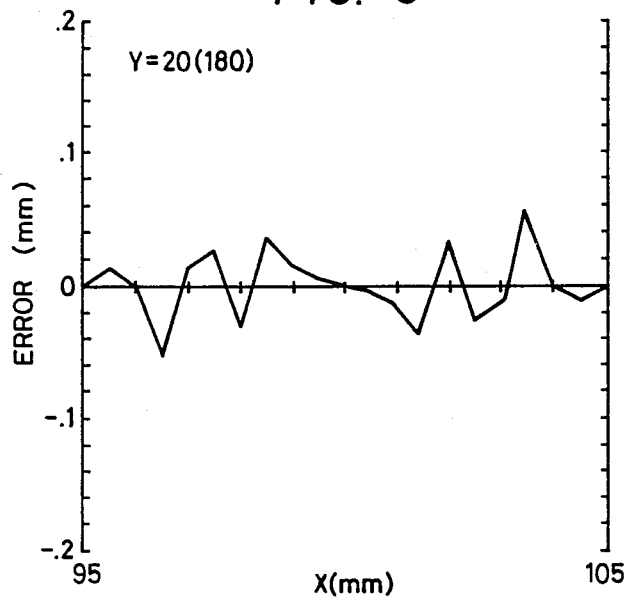
Figure 10:
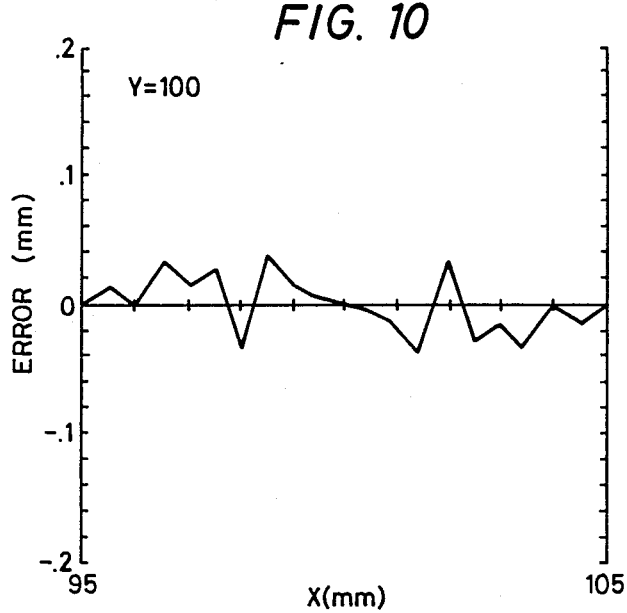
Figure 11:
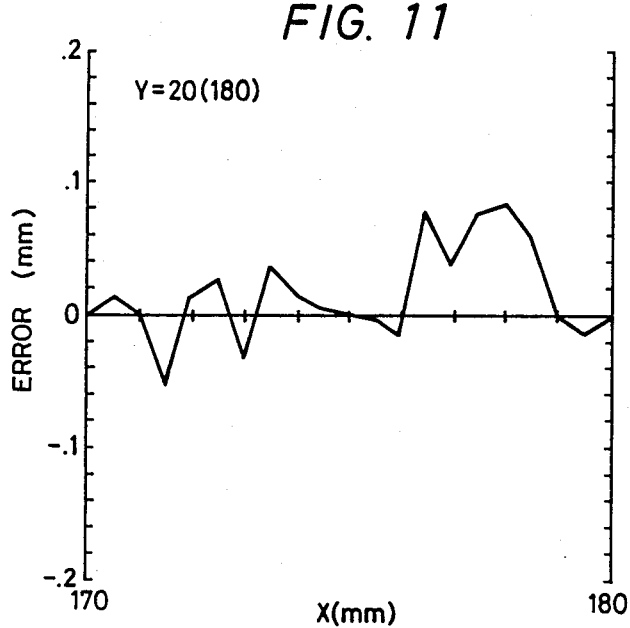
Figure 12:
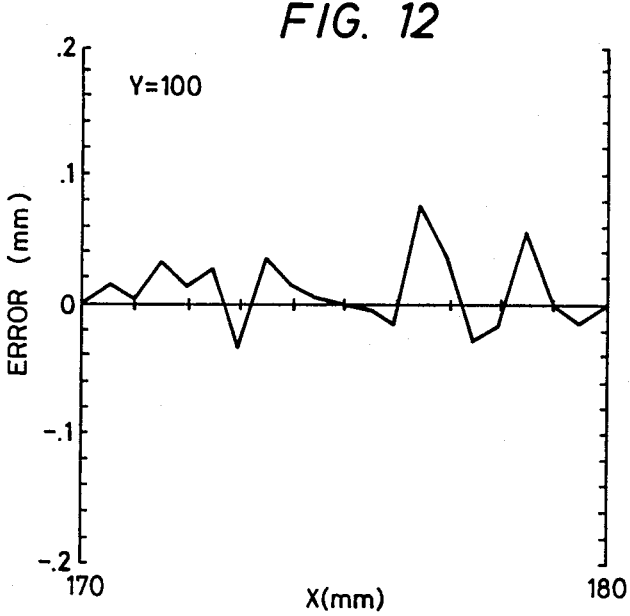

The compensating value ISC is substituted by a value for a position in the direction Y which is set at every 5 mm interval. Thus, if an error occurs in Y-direction segment judgment, there is a possibility of calling a wrong value from the ROM table 15. FIGS. 5 and 6 show the errors actually measured when the Y-direction segment judgment is wrong in the peripheral portion of the input surface which is considered to have large errors.

In FIG. 5, when the pickup 6 is positioned in the vicinity of SEG=4, namely, in the vicinity of the region in which 20 mm≦X≦30 mm, Y=25 mm (region B in FIG. 13), the errors are plotted which are produced when the control unit 10 selects the appropriate compensating value ISC=0.345 (see Table 1) which corresponds to Y=25 mm and the errors produced when the control unit 10 selects the compensating value ISC=0.357 which corresponds to an adjacent region in which Y=20 mm and ISC=0.332 which corresponds to an adjacent region in which Y=30 mm, respectively. From the graph, it is understood that the errors of the interpolating values are within a range of ±0.25 mm in maximum, even when a wrong compensating value ISC is called.

In FIG. 6, when the pickup 6 is positioned in the vicinity of the region in which Y=30 mm, the errors are plotted which are produced when the control unit 10 selects the appropriate compensating value ISC=0.332 which corresponds to Y=30 mm and the errors produced when the control unit 10 selects the compensating value ISC=0.357 which corresponds to an adjacent region in which Y=20 mm and ISC=0.309 which corresponds to an adjacent region in which Y=40 mm, respectively. From the graph, it is understood that the errors of the interpolating values are within a range of ±0.37 mm in maximum.

Accordingly, it is considered that the errors of the interpolating values do not exceed ±0.4 mm.

Correction of the interpolating value by the correction values stored in the ROM table will now be discussed.

FIGS. 7, 8, 9, 10, 11 and 12 show the results of plotting the differences between the measured values and the correction values substantially in the regions B and B' which are in the vicinity of the region in which 20 mm≦X ≦30 mm and Y=20 mm and Y=180 mm, respectively, in the region C which is in the vicinity of the region in which 20 mm≦X≦30 mm and Y=100 mm, in the regions D and D' which are in the vicinity of the region in which 95 mm≦X≦105 mm, Y=20 mm, and Y=180 mm, respectively, in the region E which is in the vicinity of the region in which 95 mm≦X≦105 mm and Y=100 mm, in the regions F and F' which are in the vicinity of the regions in which 170 mm≦X≦180 m, Y=20 mm and Y=180 mm, respectively, and in the region G which is in the vicinity of the region in which 170 mm≦X≦180 mm and Y=100 mm, respectively.

From these graphs it is understood that it is possible to detect a coordinate position with an error not greater than ±0.04 mm in the central part of the input surface 2 and ±0.08 mm in the peripheral portion thereof.

As described above, this embodiment brings about various advantages such as will be described in the following:

(1) It is possible to detect a coordinate position within the range of 20 mm of the outer peripheral portion of an input apparatus provided with an input surface of 200 mm×200 mm with an error not greater than±0.08 mm, and±0.1 mm in maximum.

(2) Since an error does not increase much with a change in the height of a pickup, the degree of freedom with respect to the height of the pickup is high.

(3) Since the pickup can be set at a comparatively high position (in this embodiment, Z=15 mm is selected), it is possible to provide a display unit such as an LCD between the input surface and the detecting portion of at the tip of the pickup, thereby enlarging the scope of application of the input apparatus.

(4) Detection is conducted not on the input surface side but on the coordinate designator (pickup 6) side, thereby involving the limited chance of picking up noise.

(5) Since the loops are driven one by one, a driver of a constant-current amplitude, operational amplifier, precision resistor or the like which is required for each loop in the prior art is dispensed with, which enables a coordinate input device to be provided with a low cost.

(6) Since it suffices simply to provide a switching element and a resistor on the conductor which constitutes a loop, there is little dispersion of current between the conductors, and adjustment which is required in the prior art is unnecessary.

(7) Since no A/D conversion of the maximum value is necessary, and not a shift register but a decoder is used for selection of each loop, the random access of the loop is enabled, thereby increasing the processing speed.

(8) The reduction in the number of circuit parts can reduce electric power consumption.

As will be obvious from the above explanation, according to the present invention, a loop is composed of a plurality of conductors, the magnetic field intensity produced by each conductor and that produced solely by the compensating loop are detected, and the coordinate position is interpolated with reference to the storage means which store in advance compensating values and correction values, respectively, in correspondence with the detected value. Thus the present invention provides a coordinate input device of high accuracy which requires a short time for processing, which involves limited possibility of picking up external noise, and which can be produced with a low cost.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A coordinate input device for determining a coordinate position on an input surface by the detection of a signal by a coordinate designator, wherein the coordinate designator can be freely pointed to a location on the input surface, said coordinate input device comprising:

an input surface in which is embedded a plurality of first parallel conductors and having also embedded a plurality of second parallel conductors, orthogonal to said first parallel conductors, said first and second parallel conductors constituting in combination a main loop;

a source line coupled to a first end of each of said first and second parallel conductors and coupled to a first drive source for providing a first drive voltage to said first and second parallel conductors;

switching means coupled to a second end of each of said first and second parallel conductors for selectively allowing current to flow through said first and second parallel conductors, said current providing scanning signals to said first and second parallel conductors;

a compensating loop embedded in said input surface consisting of a conductor which substantially surrounds said source line and said main loop, said compensating loop being coupled to a second drive source for applying a second drive voltage to said compensating loop;

a coordinate designator for detecting magnetic fields produced by said scanning signals generated by current through said first and second parallel conductors by action of said switching means and for outputting first signals corresponding to said magnetic fields;

a polarity detection means coupled to receive said first signals from said coordinate designator for detecting when an inversion of polarity of said first signals outputted by said coordinate designator occurs as said scanning signals are provided to said first and second parallel conductors by action of said switching means;

a control unit coupled to receive an output signal from said polarity detection means, said control unit also being coupled to said switching means for controlling said switching means, said control unit being also for identifying an approximate coordinate position designated by said coordinate designator based on which of said first and second parallel conductors is selected by said switch means when said polarity inversion is detected;

a first storage means coupled to said control unit for storing compensating values for retrieval by said control unit based on said approximate coordinate position designated by said coordinate designator, said control unit containing an arithmetic unit for calculating an interpolating value based on said compensating value, magnitudes of selected first signals outputted by said coordinate designator, and the magnitude of a second signal detected by said coordinate designator and generated by a current through said compensating loop; and a second storage means coupled to said control unit for storing correction values for retrieval by said control unit based on said interpolating value, said correction value for being combined with said approximate coordinate position by operation of said control unit to determine a precise coordinate position designated by said coordinate designator.

2. A coordinate input device according to claim 1, wherein said second drive source is for providing said second drive voltage to said compensating loop which is of an inverse polarity with respect to said first drive voltage provided to said source line.

3. A coordinate input device according to claim 1, wherein said second drive source is for providing said second drive voltage to said compensating loop which causes a magnitude of current to flow through said compensating loop which is a constant proportion of said current flowing through said first and second conductors comprising said main loop.

4. A coordinate input device according to claim 1, wherein said control unit is configured to control said switching means to select those ones of said first and second parallel conductors selected by said switching means prior to and subsequent to when an inversion is detected by said polarity detection means in order to determine said magnitudes of selected first signals outputted by said coordinate designator for determining said interpolating value, wherein those conductors selected designate one of a plurality of predetermined segments on said input surface within which said coordinate designator has designated a coordinate position, wherein said plurality of predetermined segments are set as to overlap each other by half the width of each segment.

5. A coordinate input device according to claim 1, wherein said coordinate designator is set at a height above said input surface equivalent to more than two times the distance between adjacent parallel conductors in said main loop.

6. A coordinate input device according to claim 1, wherein said control unit is configured to control said switching means to select those ones of said first and second parallel conductors selected by said switching means prior to and subsequent to when an inversion is detected by said polarity detection means in order to determine said magnitudes of selected first signals outputted by said coordinate designator for determining said interpolating value.

7. A coordinate input device according to claim 1, wherein said switching means is for sequentially selecting said first and second parallel conductors until an inversion of a signal is detected by said plurality detection means.

8. A coordinate input device according to claim 1, wherein an output of said coordinate designator is coupled to a detection circuit whose output is subsequently applied to said control unit for detecting the magnitude of said first signals outputted by said coordinate designator.

9. A coordinate input device according to claim 1, wherein said polarity detection means is a phase comparator.

10. A coordinate input device according to claim 1, wherein adjacent parallel conductors comprising said first and second parallel conductors are approximately 5 mm apart.

11. A coordinate input device according to claim 1, wherein said switching means comprises an X-direction switching circuit and a Y-direction switching circuit.

12. A method for designating a precise coordinate position on an input surface by a coordinate designator comprising:

sequentially driving current through each of a plurality of first and second parallel conductors comprising a main loop embedded in an input surface;

detecting magnetic field intensities generated by said current through said conductors by means of a coordinate designator;

detecting an inversion of a signal detected by said coordinate designator;

determining an approximate coordinate position of said coordinate designator based on which of said conductors was driven when an inversion occurred;

driving a first conductor selected from said plurality of conductors which was driven before an inversion was detected and detecting a first signal by said coordinate designator;

driving a second conductor selected from said plurality of conductors proximate to said first conductor but located at a position wherein current through said second conductor will cause a second signal to be detected by said coordinate designator which is inverted with respect to said first signal detected by said coordinate designator when said first conductor has current driven through it;

detecting a third signal by said coordinate designator generated by a compensating loop surrounding said main loop;

retrieving a compensating value from a first memory storage means based on said approximate coordinate position;

calculating an interpolating value based on magnitudes of said first, second, and third signals in conjunction with said compensating value;

retrieving a correction value from a second memory storage means based on said interpolating value; and calculating a precise coordinate position indicated by said coordinate designator based on said correction value combined with said approximate coordinate position.

* * * * *